US011396112B2

(12) United States Patent
Andrews

(10) Patent No.: US 11,396,112 B2
(45) Date of Patent: Jul. 26, 2022

(54) PROCESS FOR FABRICATING A COLORED POWDER COATING COMPOSITION FROM SOLID FILAMENTS

(71) Applicant: Scott Charles Andrews, Chatsworth, CA (US)

(72) Inventor: Scott Charles Andrews, Chatsworth, CA (US)

(\*) Notice: Subject to any disclaimer, the term of this patent is extended or adjusted under 35 U.S.C. 154(b) by 118 days.

(21) Appl. No.: 17/064,793

(22) Filed: Oct. 7, 2020

(65) Prior Publication Data
US 2021/0016468 A1    Jan. 21, 2021

Related U.S. Application Data

(63) Continuation of application No. 15/799,678, filed on Oct. 31, 2017, now Pat. No. 10,836,077.

(Continued)

(51) Int. Cl.
| B29B 9/02 | (2006.01) |
| C09D 5/03 | (2006.01) |
| B29B 9/06 | (2006.01) |
| B29C 64/321 | (2017.01) |
| B29C 48/05 | (2019.01) |

(Continued)

(52) U.S. Cl.
CPC .................. *B29B 9/02* (2013.01); *B29B 9/04* (2013.01); *B29B 9/06* (2013.01); *B29C 48/05* (2019.02); *B29C 48/286* (2019.02); *B29C 48/2886* (2019.02); *B29C 48/362* (2019.02); *B29C 48/92* (2019.02); *B29C 64/321* (2017.08); *B29C 67/0007* (2013.01); *C09D 5/035* (2013.01); *B29B 2009/125* (2013.01); *B29C 48/0022* (2019.02); *B29C 48/04* (2019.02); *B29C 48/266* (2019.02); *B29C 48/2888* (2019.02); *B29C 48/40* (2019.02); *B29C 48/911* (2019.02); *B29C 2793/0027* (2013.01); *B29C 2948/9238* (2019.02); *B29C 2948/92209* (2019.02); *B29C 2948/92257* (2019.02); *B29C 2948/92438* (2019.02); *B29C 2948/92704* (2019.02); *B29C 2948/92752* (2019.02); *B29C 2948/92828* (2019.02); *B29C 2948/92876* (2019.02); *B29K 2027/16* (2013.01); *B29K 2027/18* (2013.01);
(Continued)

(58) Field of Classification Search
CPC .................................................. B29C 48/2886
See application file for complete search history.

(56) References Cited

U.S. PATENT DOCUMENTS 3,275,591 A    9/1966    Tomlinson
4,004,940 A    1/1977    Cormier
(Continued)

OTHER PUBLICATIONS

James Corbett; Reprap Colour Mixing Project; May 1, 2012; Department of Mechanical Engineering, University of Bath; United Kingdom.
(Continued)

*Primary Examiner* — Atul P. Khare
(74) *Attorney, Agent, or Firm* — David M. Kleiman

(57) ABSTRACT

A process for fabricating a powder coating composition having a desired color from solid input filaments. A plurality of solid input filaments is fed to a mixer in accordance with an input formulation for a color. The input filaments are liquefied at the mixer, and the liquefied input filaments are combined together in the mixer into an extrudate mixture. The extrudate mixture is removed from the mixer, solidified, and then the solidified extrudate mixture is milled into a powder.

6 Claims, 6 Drawing Sheets

Related U.S. Application Data

(60) Provisional application No. 62/558,310, filed on Sep. 13, 2017.

(51) Int. Cl.

| | | |
|---|---|---|
| *B29C 48/36* | (2019.01) | |
| *B29C 48/285* | (2019.01) | |
| *B29C 48/92* | (2019.01) | |
| *B29C 67/00* | (2017.01) | |
| *B29B 9/04* | (2006.01) | |
| B29K 105/00 | (2006.01) | |
| B33Y 30/00 | (2015.01) | |
| B29K 27/00 | (2006.01) | |
| B29K 27/18 | (2006.01) | |
| B29C 48/40 | (2019.01) | |
| B29B 9/12 | (2006.01) | |
| B29C 48/00 | (2019.01) | |
| B33Y 10/00 | (2015.01) | |
| B29C 48/88 | (2019.01) | |
| B29C 48/04 | (2019.01) | |
| B29C 48/25 | (2019.01) | |

(52) U.S. Cl.
CPC ....... *B29K 2105/0032* (2013.01); *B33Y 10/00* (2014.12); *B33Y 30/00* (2014.12)

(56) References Cited

U.S. PATENT DOCUMENTS

| | | |
|---|---|---|
| 4,247,202 A | 1/1981 | Failes |
| 5,319,001 A | 6/1994 | Morgan et al. |
| 5,856,378 A | 1/1999 | Ring et al. |
| 5,963,333 A | 10/1999 | Walowit et al. |
| 6,348,520 B1 | 2/2002 | Ohnishi et al. |
| 6,583,187 B1 | 6/2003 | Daly et al. |
| 6,832,913 B2 | 12/2004 | Lehmann |
| 6,984,420 B2 | 1/2006 | Suzuki et al. |
| 7,206,100 B2 | 4/2007 | Namikata |
| 7,441,719 B2 | 10/2008 | Verhoef et al. |
| 7,466,415 B2 | 12/2008 | Gibson et al. |
| 9,643,362 B2 | 5/2017 | Amadio et al. |
| 2004/0028808 A1 | 2/2004 | Williams et al. |
| 2005/0212159 A1 | 9/2005 | Richards et al. |
| 2005/0250879 A1 | 11/2005 | Correll et al. |
| 2009/0162543 A1 | 6/2009 | Topaz |
| 2010/0327479 A1 | 12/2010 | Zinniel et al. |
| 2014/0350867 A1 | 11/2014 | Alspach et al. |
| 2015/0142159 A1 | 5/2015 | Chang |
| 2015/0266235 A1 | 9/2015 | Page |
| 2016/0238451 A1 | 8/2016 | Sheridan |
| 2016/0271619 A1 | 9/2016 | Pallman |

OTHER PUBLICATIONS

Nov. 5, 2018 International Search Report and Opinion.

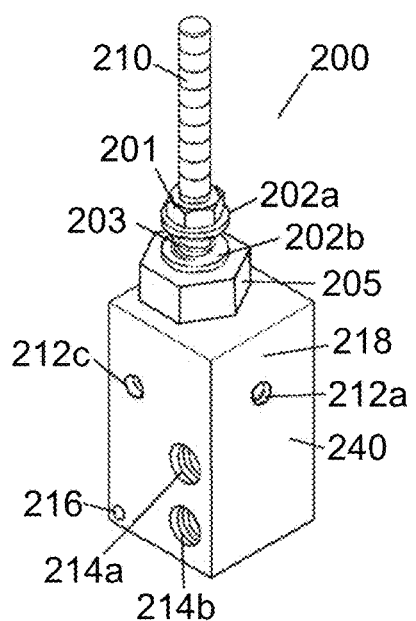
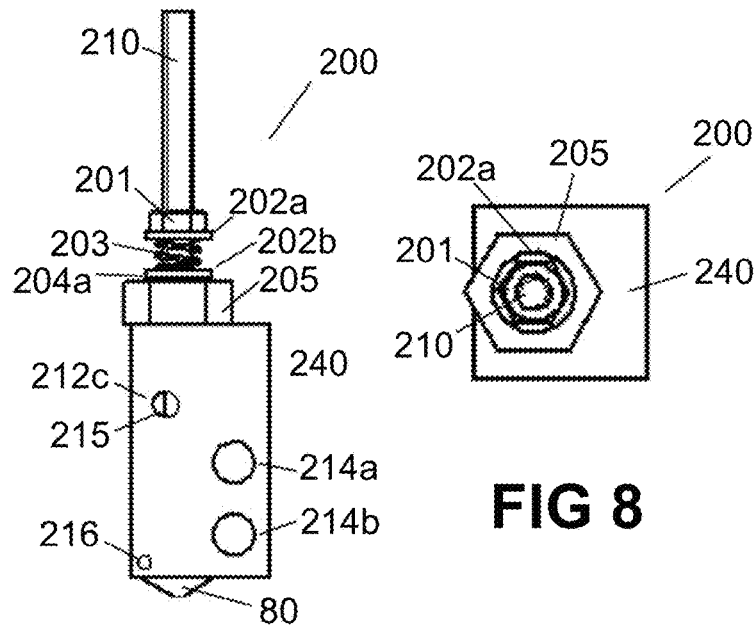
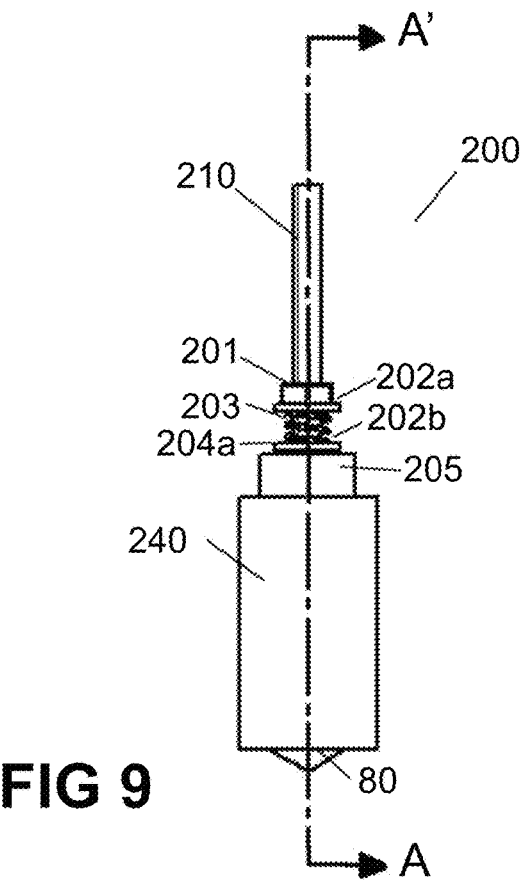
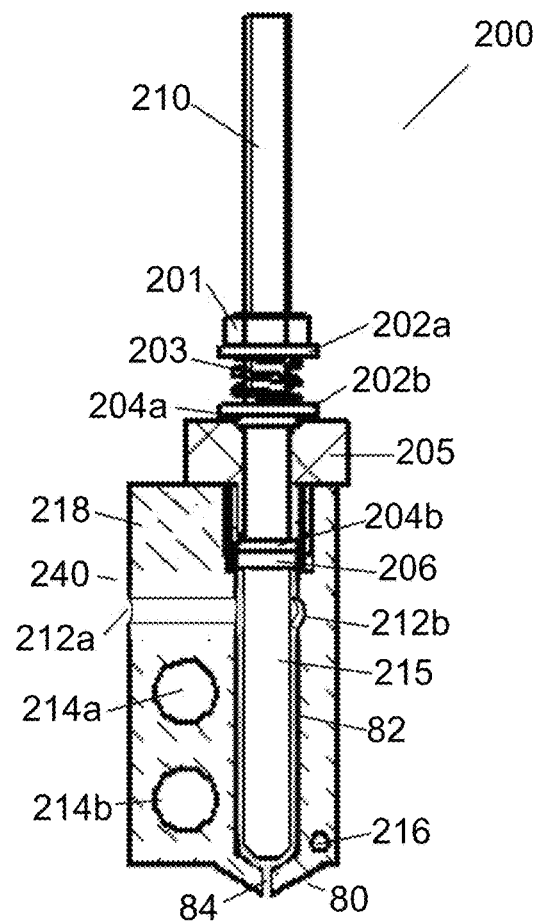

PROCESS FOR FABRICATING A COLORED POWDER COATING COMPOSITION FROM SOLID FILAMENTS

This application is a continuation of U.S. patent application Ser. No. 15/799,678 filed Oct. 31, 2017 for which the benefit of priority is claimed, and this application also claims the benefit of priority to U.S. provisional patent application 62/558,310 filed on Sep. 13, 2017. The full contents of each of the aforementioned applications are hereby incorporated by reference.

TECHNICAL FIELD

The present invention is in the field of powder coatings. More specifically the field of fabricating a powder coating composition.

BACKGROUND

Powder coating manufacturers and applicators have been unable to rapidly create small batches of custom colors (or any color) for customers. This is quite different than the traditional liquid paint industry norm. The liquid paint/coatings industry has always had the ability to easily mix a red and a white paint to achieve a new pink color. Powder coating applicators however have been unable to effectively do this.

Currently all powder coating formulations need to come from a manufacturer of powders. These manufacturers must combine all the ingredients together in dry form and then extrude them into a melt mixed color. That melted material is then cooled after it leaves a twin-screw extruder and is then broken into chips that are subsequently ground into a powder.

This process takes typically about three weeks to accomplish and the process typically comes with minimum purchases of powder from fifty to two-hundred and twenty pounds that can cost hundreds to thousands of dollars. This cost and time expenditure causes clients of powder coat applicators to either choose a color that they don't want or change to a liquid paint option and give up durability to save time and money. Both the client and the powder coating applicator are not satisfied.

To date the only option that works with less precision and without good homogenous mixing is to use a dry blended process. This takes a powder that is close in color and then adds pigment to shift the color to another color. This process dilutes the original formulation and the dilution is not fully blended as the materials start out as two separate dry powders that never fully mix during the oven curing process. This process only allows for slight changes to colors and does not always work well. Powder coating applicators avoid dry blended colors for this reason: They are substandard to properly melt-mixed formulations. There is no other way currently to make powder coating materials than the twin-screw extrusion process.

SUMMARY OF THE INVENTION

The present invention combines the technology of additive manufacturing with filament materials (i.e. three-dimensional (3D) printing using filament inputs) with the technologies of color measurement and creation to facilitate the rapid fabrication of small batch custom color powder coating compositions. The application of these technologies in the system and process of the present invention puts custom color production and matching in the hands of many facilities without needing the exorbitant expense in time and money required for formulating large batch powder coating colors in the traditional factory way.

In a preferred embodiment of the system of the present invention a fabricator as described herein is utilized to combine a plurality of single-color polymer filaments that are solid at an average room temperature (e.g. 20-25 degrees Celsius) to rapidly produce a small batch of polymer powder coating composition with a desired color. The fabricator utilized by the system of the present invention in a contemplated embodiment is similar in size and operation to a modern desktop 3D printer that utilizes various filament inputs to rapidly produce three-dimensional printed parts, such as by way of example a Replicating Rapid Prototyper ("Reprap") 3D printer utilizing plastic filaments with standard diameters of approximately 1.75 mm or 2.85 mm as the material inputs.

Another example of a modern desktop 3D printer that utilizes a combination of single-color input polymer filaments to create colored printed objects is the Rova 4D printer which combines cyan, magenta, yellow, black, and white filaments to produce a wide gamut of different colors. The Rova 4d is available from Ord Solutions Inc., 6-250 Dundas Street South, Cambridge, Ontario N1R 8A8, Canada; ordsolutions.com.

Others have also previously demonstrated the ability to combine single-color input polymer filaments utilizing a conventional additive 3D printer to produce colored printed products. See e.g. *Reprap Colour Mixing Project*; James Corbett; May 1, 2012; Department of Mechanical Engineering, University of Bath.

However, while it has been known in additive 3D printing to combine different colored filament inputs to produce a colored 3D printed object, such technology has never previously been applied in a controlled manner to the fabrication of powder coating compositions. The system and process of the present invention is the first to utilize 3D filament printing technology in the controlled production of small batches of a powder coating composition having a desired color.

In a contemplated embodiment of the process and system of the present invention a data representation of a desired color for a powder coating composition is acquired. The data representation is contemplated to be a value of the desired color in one or more established color spaces. The data representation acquisition may be from a measurement of a sample having the desired color.

From the acquired color data representation an input formulation of single-color polymer filaments that can be combined to achieve an extrudate mixture of the single-color polymer filaments resulting in a powder coating composition with the desired color is determined. It is contemplated that this determination may be done through a comparison of the acquired data representation to a collection of previously acquired color measurement data stored in a color library database component of the system.

Associated with each color measurement data object in the color library database would be at least one input formulation data object with the data (i.e. recipe) for combining known and available single-color polymer filaments to obtain an extrudate mixture that will produce a powder coating composition with a color measurement the same as the associated color measurement data object. It should be noted that there could be multiple input formulation data objects associated with a single given color measurement data object if there are multiple input formulations (e.g.

using input polymer filaments with different functional characteristics or from different manufacturers) that will result in the same color measurement value. The system of the present invention would determine which color measurement data in the color library database is closest to the acquired data representation of the desired color, and from this determine the best input formulation to achieve a powder coating with the desired color and functional properties.

The best input formulation determined to be used, along with any other necessary information for producing the batch of powder coating composition, is then communicated to an electronic fabricator controller which exercises control over the operation of the powder coating fabricator component of the system. In accordance with the best input formulation determined and communicated to the fabricator controller the appropriate combination and quantities of input filaments will be fed into a mixer component of the fabricator. In the mixer they will be liquefied and combined into a homogenous extrudate mixture which will exit the mixer to deposited onto an extrudate receiving platform.

In a contemplated embodiment of the system of the present invention a combination of cyan, magenta, yellow, black and white (CMYK+W) input filaments are used to achieve a wide gamut of colors when being combined in the filament mixer. However, the present invention is not limited to the use of CMYK+W filaments, and other input filaments with other colors (e.g. red, green, blue, transparent, etc. . . . ) may also be used.

In a contemplated embodiment of the process and system of the present invention the extrudate mixture is solidified on the extrudate receiving platform preferably into a substantially thin sheet like form. The solidification is contemplated to be accomplished in most instances by active and/or passive cooling of the extrudate mixture. However, other means of solidification may be employed as well.

From the extrudate receiving platform (which may be a moveable conveyer system) the solidified extrudate mixture is processed through an extrudate mill to be comminuted into a finished powder coating composition having the desired color. In a contemplated embodiment the solidified extrudate mixture is milled by first kibbling the solidified mixture into smaller chips, then grinding such chips into a powder, and then refining the ground powder into a dedusted powder with the desired particle size. In some embodiments the particle size distribution of the finished powder coating composition may be checked using a particle size analyzer for quality control purposes prior to packaging the finished powder coating composition.

The finished powdered coating composition exiting the extrudate mill will have the same color as the desired color input into the system at the beginning of the process. This can be confirmed by obtaining a data representation of the color of the finished powder coating composition and comparing it to the acquired data representation of the desired color input into the system.

The system and process of the present invention will allow the stocking by powder coating manufacturers and applicators of a relatively small selection and quantity of single-color input filaments that can be used in the system and process of the present invention to permit the applicator to rapidly and economically make small batches of custom color powders matching colors desired by customers. This will allow for manufacturers and applicators to carry reduced powder inventories and increase their sales/production capabilities.

BRIEF DESCRIPTION OF THE DRAWINGS

FIG. 6 is a front right side perspective view of an exemplary embodiment of a hot end of a filament mixer component of the system of the present invention.

FIG. 7 is a right side view of the exemplary embodiment of the hot end of a filament mixer component as shown in FIG. 6.

FIG. 8 is a top side view of the exemplary embodiment of the hot end of a filament mixer component as shown in FIG. 5.

FIG. 9 is a rear side view of the exemplary embodiment of the hot end of a filament mixer component as shown in FIG. 5.

FIG. 10 is left side sectional view along axis A-A' of the exemplary embodiment of the hot end of a filament mixer component as shown in FIG. 5.

DETAILED DESCRIPTION OF THE INVENTION

Figure 1:
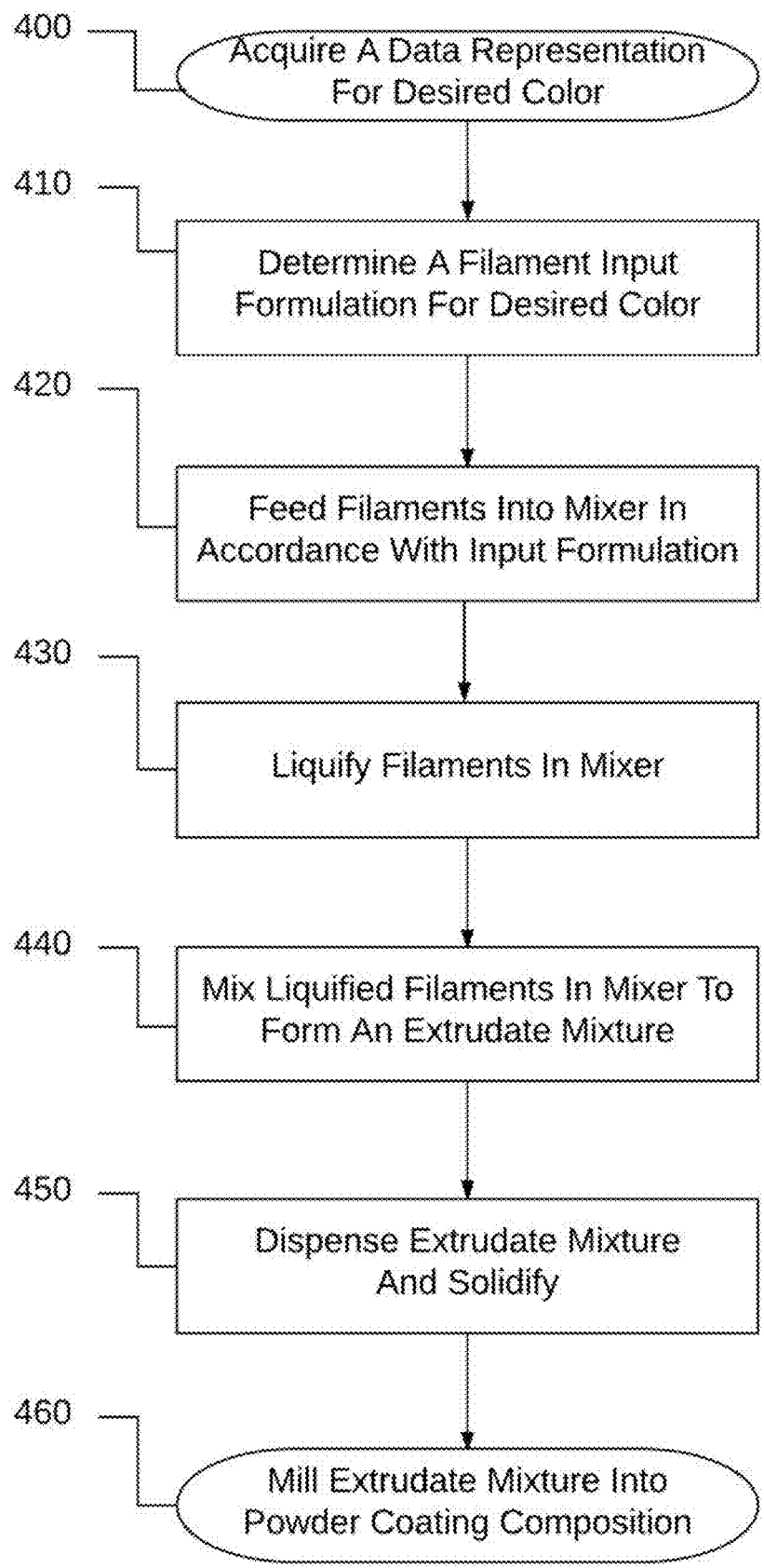
FIG. 1 is a chart outlining the steps of an exemplary embodiment of the process of the present invention using one or more input filaments to produce a powder coating composition with a desired color.
Figure 3:
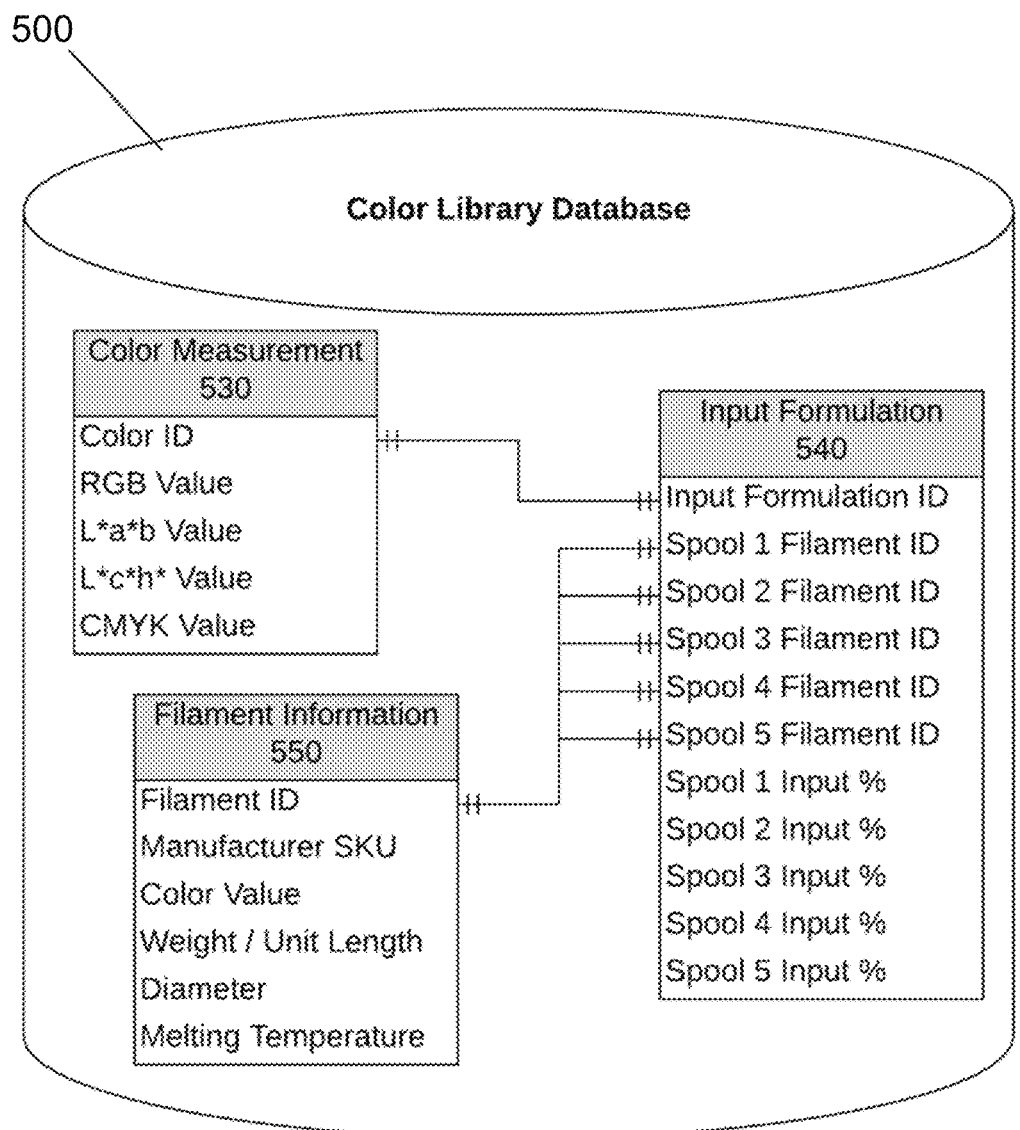
FIG. 3 is schematic representation of an embodiment of a color library database of an embodiment of the system of the present invention.

Referring to FIG. 1 the first step 400 of the process of the present invention to produce a color matched powder coating is to obtain a data representation of the desired color for the end-product powder coating to be fabricated. Referring to FIG. 3 it is contemplated in an embodiment of the system of the present invention that there will be a color library database 500 stored in a storage medium that is either a part of the system itself or accessible to the system.

Figure 2:
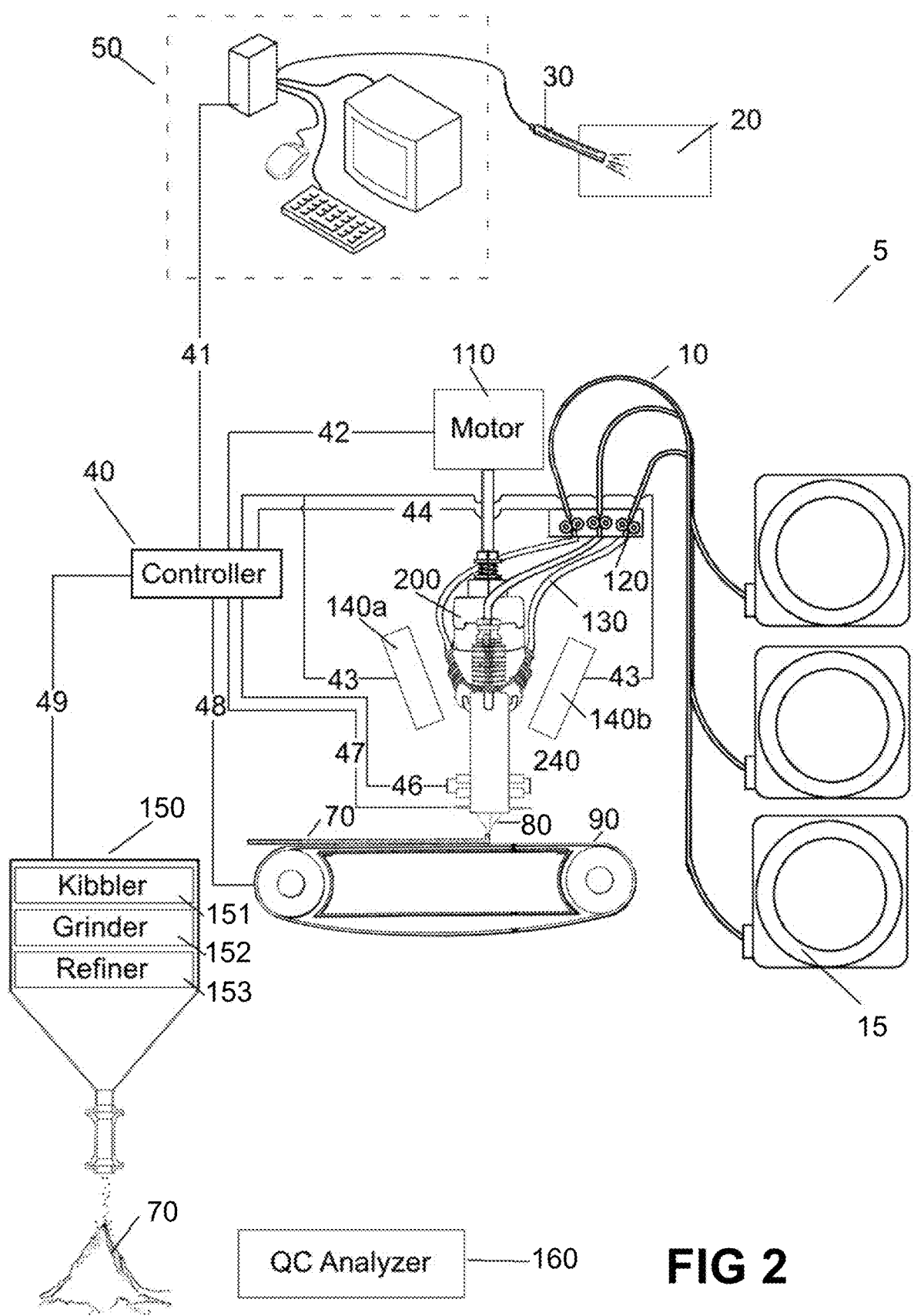
FIG. 2 is a schematic view of an exemplary embodiment of the inventive system used to create from one or more input filaments a powder coating having a desired color.

Thus, referring to FIG. 2 the color library database 500 may be located in a storage medium that is part of fabricator controller 40 or a part of computer station 50. In such cases the storage medium may be any electronic or optical computer readable storage medium, such as by way of example, ROM, RAM, a hard disk drive, flash memory, optical disk etc. . . . Color library database may also be stored in a remote memory storage location that is accessible to the system over a network such as Wi-Fi, Bluetooth, Ethernet, the Internet, etc. . . . Parts or all of the color library may also exist in visually perceptible tangible form, such as for example a printed catalog of colors, with each color in the catalog being visually displayed along with associated information such as a human readable data representation of the color (e.g. a color space value such as CMYK, CMYK+W, RGB, L*a*b, L*c*h* etc. . . . ), as well as a computer readable data representation such as a bar code that may be scanned by a bar code reader of the system. Thus, a person using the system may manually enter a data representation into the system using input means such as a keyboard and/or mouse, or may scan a data representation of a color value into the system from a barcode.

Referring to FIG. 2 it is also contemplated that in an exemplary embodiment of a system that may be used for performing the process of the present invention a data representation of color is obtained by measuring the color of a sample 20 that has the desired color for the end-product powder coating composition to be fabricated.

The measurement of the color of sample 20 may be performed using a color sensor 30 operatively attached to computer station 50 or fabricator controller 40. Color sensor 30 may be comprised of a colorimeter, a 0/45° geometry spectrophotometer, a 45/0° geometry spectrophotometer integrating sphere geometry spectrophotometer, and/or commercially available hand-held color measurement equipment such as the Nix Pro Color Sensor available from Nix Sensor Ltd. (nixsensor.com), along with accompanying color sensor software used by computer station 50. See also U.S. patent application publication 2016/0238451A1 Aug. 18, 2016 (Sheridan), and U.S. Pat. No. 5,963,333 Oct. 5, 1999 (Walowit et al), the contents of each of which are hereby fully incorporated by reference.

The color sensor 30, such as the Nix Pro Color Sensor, is used to scan the surface of the sample 20 and send one or more color measurement signals to be stored and processed by color sensor software on computer station 50. The measurement signals are converted into a data representation of the sample color (i.e. the desired color for the end-product powder coating). The data representation may be, by way of example, RGB, CMYK, HSL, XYZ, and LAB.

Referring to FIG. 1 the second step 410 of the process of the present invention to produce a powder coating with a desired color is to determine the correct input formulation of input polymer filaments that will be used to produce the powder coating composition with the desired color. In a preferred contemplated embodiment the determination of the input formulation is done using color library database 500 stored in a memory location accessible to the processor of computer station 50 or fabricator controller 40.

Referring to FIG. 3 in an exemplary embodiment the color library database 500 used in the present system comprises instances of data objects such as, by way of example, instances of a filament information data object 550, a color measurement data object 530, and an input formulation data object 540. As shown, it is contemplated that the data objects are data structures with multiple data fields which may be multiple data types. In the contemplated exemplary embodiment color library database 500 is an object database (i.e. object orientated database management system, OODBMS), but may also be implemented in other forms such as a relational database.

Referring to FIG. 3 an instance of color measurement data object 530 is contemplated to contain a data field with a unique color identification (Color ID) for the color of that instance and also at least one other data field to contain a data representation of the color in a particular color space. As shown an instance of color measurement data object 530 is contemplated to hold multiple fields for multiple data representations of the color in different color spaces (e.g. RGB, L*a*b, L*c*h*, CMYK, etc. . . . ). By way of example, and instance of color measurement data object 530 may contain a data representation of the color in the L*a*b color space which would be comprised of a luminance (L) value, an a value, and a b value. In a preferred embodiment of the present system it is contemplated that the data representation of the color in the fields of the color measurement data object 530 would be acquired empirically from measurements made of previously manufactured powder coating composition.

Similarly, by way of example, an instance of input formulation data object 540 may be comprised of a data field with unique identification of the input formulation (e.g. Input Formulation ID) and other data fields for the input formulation of various filaments that are used to manufacture the powder coating composition with the related instance of color measurement data object 530. An instance of an input formulation data object 540 is contemplated to be comprised of fields that identify each filament (by a unique filament identification value) on each filament spool 15 of fabricator 5, and fields containing the percentage ratio data for each filament 10 used in making the powder coating composition with the related instance of color measurement data object 530.

Additional information on each filament that is used in an input formulation 540 is contemplated to be contained in a related instance of a filament information data object 550. Examples of data fields in an instance of a filament information data object 550 include fields for the unique system filament identification (e.g. Filament ID), the manufacturer stock keeping unit/model (i.e. SKU), a color value of the filament (i.e. a data representation of the color of the filament such as that for red, green, blue, cyan, magenta, yellow, black, white, etc.), a density measurement of the filament (i.e. the weight of the filament per unit length), the diameter of the filament, and the melting temperature.

These are just some examples of data objects and/or their fields which may be incorporated into color library database 500. Other data objects and/or fields may also be used, such as fields for data on the color measuring equipment that was used to obtain the color measurement value that is stored in the color measurement data object 530, or data fields for the mixing chamber temperature, mixing times, mixing rates, filament feed rates, apparatus specifications, environmental conditions, post additives, milling specifications, etc. . . . that could be in an input formulation data object 540.

It is contemplated that each color measurement data object 530 and related input formulation data object 540 shall have been obtained empirically through an actual color measurement made of powder coating composition made in accordance with the data of the input formulation. Preferably, for reasons of accuracy, the data in color measurement data object 530 should be a statistical reliable result from multiple measurements made on sufficient number of batches made using the related input formulation. Preferably the powder coating composition batches used to obtain the color library database data were also manufactured using substantially the same system apparatus, with substantially the same input polymer filaments (i.e. particular filament formulations identified by stock keeping units (sku) and/or unique model numbers), under substantially similar environmental conditions as is contemplated to be used when manufacturing a batch of powder coating with a color of the measured sample 20.

To determine the best input formulation in the color library database 500 to use for fabricating a powder coating composition it is contemplated that the processor of computer station 50 executes a software comparison routine to determine which instance of color measurement data object 530 stored in color library database 500 is closest to the data representation of the desired color input into the system (e.g. the measured color value of the sample 20). In a contemplated embodiment the comparison routine uses the widely known ΔE (Delta-E) calculation to determine which instance of color measurement data object 530 is closest in value to the data representation of the desired color. In calculating ΔE the routine may make use of, by way of example and not limitation, the widely known CIE76 formula if the color values are in the L*a*b color space, or may use the widely known and more recent CIEDE2000 formula if the color values being compared are in the L*c*h* color space. The best input formulation data object 540 available in the color database 500 to use in making a powder coating composition with the desired color will be the input formulation related to the color measurement data object 530 having the lowest ΔE value with respect to the data representation of the desired color input into the system.

Ideally the ΔE value will be equal to zero (ΔE=0) indicating that the stored color measurement is identical to the data representation of the desired color input into the system. However, there may be situations where ΔE does not equal zero (ΔE≠0) such that the best stored color measurement is not identical to data representation of the desired color input into the system. This would mean that the color library database 500 of the system does not have an input formulation to make an exact color match. However, it is possible that the closest color match stored in the system may still be satisfactory. It is a common standard that if the ΔE value for two compared color measurements is less than two (ΔE<2) that the difference in the two colors will not be perceptible to most people. Accordingly, a user of the process and system of the present invention may be satisfied with an end-product powder coating composition using an existing input formulation with a ΔE<2 because they won't perceive a difference.

However, to the extent an identical, or closer to identical, color match is desired the system of the present invention is well suited to empirically deriving a new input formulation to provide a closer or exact match. Specifically, because the system of the present invention uses the rapid additive manufacturing technology of 3D printing it is well suited to relatively quickly producing a small batch of powder coating composition using a slightly adjusted input formulation from the input formulations determined to have the lowest ΔE values. Such a rapidly produced small batch can be color measured, added to the color library database 500, and it can then be determined through another ΔE calculation whether it is a better match to the data representation of the desired color input into the system. This process of adjusting the input formulation of the lowest stored color measurement ΔE value can be repeated as necessary until a new input formulation is arrived at that can produce a powder-coating composition using the present invention that has a stored color measurement with a ΔE value small enough to be satisfactory.

Referring to FIGS. 1 and 2 the third step 420 in the process of the present invention is the feeding of input filaments 10 into mixer 200 in accordance with the input formulation determined in the previous step 410. In a contemplated embodiment of the system this step begins with instances of input formulation data object 540 and any related filament information data objects 550 being communicated via controller interface bus 41 from computer station 50 to fabricator controller 40.

In a contemplated embodiment of the system of the present invention fabricator controller 40 will have its own processor, memory, firmware, power supply, and input/output. By way of example fabricator controller 40 may be an Arduino microcontroller board having at least one attached Arduino shield circuit board containing specific electronics, drivers, and sensors for system operation. By way of example and not limitation fabricator controller 40 may comprise an Arduino Due board having a 32-bit ARM core microcontroller with an attached Arduino shield circuit board having the specific electronics, drivers, and sensors needed for powering, communicating with, and controlling other operational elements of the system such as the filament feeder 120, the mixer motor 110, the active cooling fans 140a and 140b, the heating elements 250a and 250b, the mixer temperature sensor 260, extrudate receiving platform 90, and extrudate mill 150. It is contemplated that fabricator controller 40 will use the commonly available Marlin firmware widely used with Arduino circuit boards. While fabricator controller 40 may be a component of fabricator 5, separate and apart from computer work station 50, it may also be incorporated as one or more extension boards in a computer station 50.

It is contemplated that a user of the system of the present invention will enter the desired weight of powder coating composition 70 to be fabricated into computer station 50 (e.g. through a mouse and/or keyboard). The data of the desired weight will be communicated to fabricator controller 40 which will use this data to determine from the instances of input formulation data object 540 and filament information data objects 550 received what the total quantity of each input filament 10 to be used must be. Fabricator controller 40 will also determine from the input formulation data object the rate that each input filament 10 must be fed into filament mixer 200 to maintain the correct ratio of input filaments in the extrudate mixture to achieve the desired color. Fabricator controller 40 will also determine the total time to feed the input filaments into the filament mixer 200 to obtain the desired weight of end-product. Fabricator controller 40 may also determine from the instances of input formulation data object 540 and filament information data objects 550 received other operational parameters for mixing mechanism 210 (e.g. pattern and/or rotational speed), active cooling mechanism fans 140a and 140b (rotational speed), interior mixing chamber 240 (e.g. temperature), extrudate receiving service 90 (e.g. movement direction and speed, temperature), and extrudate mill 150. Fabricator controller 40 will communicate (send and/or receive) power, control, and/or data signals with the other system components over various system controller buses, such as is shown in FIG. 2 for example: Bus 41 (input bus), bus 42 (mixer bus), bus 43 (cooling bus), bus 44 (feeder bus), bus 46 (heating bus), bus 47 (temperature bus), bus 48 (receiving platform bus), and bus 49 (milling bus).

For purposes of the present specification the term "bus" is intended to include all hardware that may be used to communicate power, control, or data signals and/or transfer energy (e.g. electrical power). Accordingly, a bus may comprise by way of example and not limitation one or more electrical paths (e.g. one or more wires, printed circuits, etc. . . . ), one or more optical paths (e.g. one or more fiber optic cables), and/or one or more electromagnetic signal paths or protocols (e.g. radio signals like FM, AM, Bluetooth or Wi-Fi).

Referring to FIG. 2 in a contemplated embodiment of the system of the present invention data (such as the data object of an input formulation) and/or power (e.g. electrical power for the fabricator controller 40 and/or other fabricator 5 components) may be communicated between computer station 50 and fabricator controller 40 over input bus 41. Power, control, and/or data signals used to activate, turn off, and/or control the rotational speed and direction of filament mixer motor 110 may be communicated over mixer bus 42. Power, control, and/or data signals used to activate, turn off, and/or control the rotational speed and direction of active cooling mechanism fans 140a and 140b may be communicated over cooling bus 43. Power, control, and/or data signals used to activate, turn off, and/or control the speed of filament feeder 120 may be communicated over feeder bus 44. Power, control, and/or data signals used to activate, turn off, and/or control the current to heating elements 250a and 250b may be communicated over heating bus 46. Power, control, and/or data signals used to activate, turn off, and/or obtain information from temperature sensor 260 may be communicated over temperature bus 47. Power, control, and/or data signals used to activate, turn off, and/or control the extrudate receiving platform 90 may be communicated over conveyer bus 48. Power, control, and/or data signals used to activate, turn off, and/or control the extrudate mill 150 may be communicated over mill bus 49.

Referring to FIG. 2 a filament feeder 120 is used to move (i.e. feed) the input filaments 10 into filament mixer 200 and is contemplated to comprise at least one filament driver 300 for each input polymer filament. A filament driver for purposes of this application is any device that can physically move an input polymer filament in a controlled manner into filament mixer 200.

Figure 5:
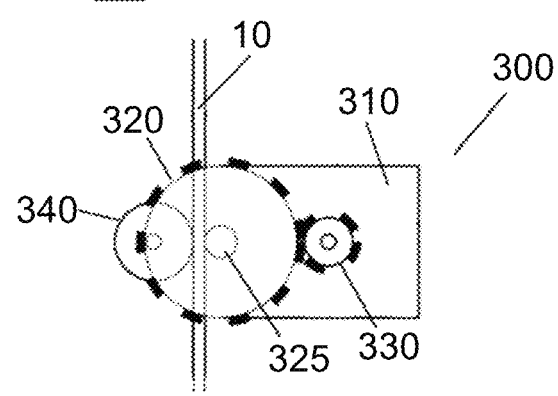
FIG. 5 is a schematic view of an exemplary embodiment of a filament driver component of the system of the present invention.

Referring to FIG. 5 in a preferred contemplated embodiment of the system of the present invention filament driver 300 is comprised a stepper-motor 310 which is controlled by fabricator controller 40 (e.g. with a stepper-motor driver module). Stepper-motor 310 drives one or more small gears 330 which drive one or more larger gears 320 that are attached to a drive wheel 325. An input polymer filament is gripped frictionally between drive wheel 325 and rotatable bearing 340. When the stepper motor 310 is activated it turns a small gear 330, which results in the turning of a larger gear 320, which results in the turning of drive wheel 325 causing input filament 10 which is gripped between drive wheel 325 and bearing 340 to move in a linear fashion tangential to the direction of rotation of drive wheel 325.

Use of a filament driver 300 incorporating a stepper-motor with such a gear drive mechanism allows fabricator controller 40 to rotate stepper-motor 310 an exact distance at a precise speed, which in combination with gearing, allows the drive wheel to turn slowly thus increasing the torque and facilitating input polymer filament 10 being moved into filament mixer 200 with greater force and precision. This facilitates being able to incrementally adjust at a very high resolution the input filament ratios being fed into filament mixer 200 which can therefore achieve a wide gamut of possible output colors for powder coating mixtures.

A preferred embodiment of an input filament 10 for use in the system of the present invention is comprised of a polymer resin carrier and a plurality of colored pigment particles dispersed throughout the resin carrier. Use of the system of the present invention is well suited to the fabrication of thermoplastic powder coatings as use of a thermoplastic polymer resin carrier has the advantages of the carrier being able to melt under heat while retaining its chemical composition upon re-liquefying. Examples of thermoplastic polymer resin carriers which may be used include, but are not limited to, polyamide (i.e. nylons); fluoropolymers such as polyvinylidene fluoride (PVFD), fluoroethylene vinyl ether (FEVE), and polytetrafluoroethylene (PTFE); polyethylene, polyvinyl chloride, polypropylene, polylactic acid (PLA), acrylonitrile butadiene styrene (ABS), and polycarbonate. It should be noted that the invention is not limited to thermoplastic resin carriers, but can include the use of any carrier resin which can contain a dispersion of color pigment particles and be formed into a filament that can subsequently be liquefied for mixing with other components and the resulting homogenous mixture solidified again for milling into a powder suitable for a powder coating application. The present invention is also contemplated to utilize thermosetting resins such as by way of example and not limitation polyester, polyurethane, acrylic, super durable polyesters, epoxy and hybrids of these.

The pigment particles that give the color to each input filament 10 are insoluble in the resin carrier and are responsible for giving opacity and/or color to the input filament 10. Examples of pigments include, but are not limited to, pigments comprised of aluminum e.g. Ultramarine and Ultramarine Violet), antimony (e.g. Antimony White), barium (e.g. Barium Sulfate and Lithopone), copper (e.g. Han Purple, Han Blue, Egyptian Blue, Azurite, Malachite, Paris Green, Scheele's Green, and Verdigris), cobalt (e.g. Cobalt Violet, Cobalt Blue, Cerulean Blue, Cobalt Green, and Cobalt Yellow) carbon (e.g. Carbon Black, Ivory Black, Vine Black, and Lamp Black), manganese (e.g. Manganese Violet, Manganese Blue, and Manganese Dioxide), mercury (e.g. Vermillion), iron (e.g. Prussian Blue, Yellow Ochre, and Mars Black), iron oxide (e.g. Sanguine, Caput Mortuum, Indian Red, Venetian Red, Oxide Red, Red Ochre, and Burnt Sienna), cadmium (e.g. Cadmium Green, Cadmium Yellow, Cadmium Orange, and Cadmium Red), chromium (e.g. Chrome Green, Viridian, Chrome Yellow, and Chrome Orange), arsenic (e.g. Orpiment), bismuth (e.g. Primrose Yellow), lead (e.g. Naples Yellow, Lead-Tin Yellow, Minium, and Lead White), titanium (e.g. Titanium Yellow, Titanium Black, and Titanium White), tin (e.g. Mosaic Gold), and zinc (e.g. Zinc Yellow, and Zinc White). Further possible pigments for possible use in the system of the present invention may be determined by reference to the *Colour Index* produced by the Society of Dyers and Colourists (SDC) and American Association of Textile Chemists and Colorists (AATCC).

In a contemplated embodiment of the system of the present invention single-color input filaments 10 are used that have a color, by way of example and not limitation, of either cyan (C), magenta (M), yellow (Y), black (K), white (W), red (R), green (G), or blue (B) 20. In a contemplated embodiment of the system of the present invention each such single-color input filament 10 is placed onto a filament spool support 15 that is part of fabricator 5.

The pigment used in a single-color input filament 10 should be homogenously dispersed in the resin carrier to help ensure accurate and reproducible results when mixing input filaments 10 to obtain powder coating with a desired color. Methods which may be used to help ensure proper pigment dispersion in the manufacture of an input polymer filament are found in U.S. Pat. No. 3,275,591 issued Sep. 27, 1966 (Tomlinson) and U.S. Pat. No. 4,004,940 issued Jan. 25, 1977 (Cormier), the contents of each of which is hereby fully incorporated by reference. The size of the pigment particles used in an input polymer filament 10 should be minimized to help ensure that the color of the powder coating will not be mottled. See e.g. U.S. Pat. No. 5,319,001 issued Jun. 7, 1994 (Morgan et al), U.S. Pat. No. 6,348,520 issued Feb. 19, 2002 (Ohnishi et al), and U.S. Pat. No. 6,984,420 issued Jan. 10, 2006 (Suzuki et al) the contents of each of which are hereby fully incorporated by reference. See also U.S. Pat. No. 9,643,362 issued May 9, 2017 (Amadio et al) the contents of which are hereby fully incorporated by reference.

In a preferred contemplated embodiment of the system of the present invention combinations of single-color input filaments 10 are used to create a powder coating with a desired color. However, the system is also contemplated to be able to incorporate and utilize other types of input filaments that can provide features and characteristics to the powder coating 70 other than color. Such other functional input filaments may, by way of example and not limitation, be other types of resins (e.g. thermosetting epoxy or polyester), curing agents (i.e. hardeners) such as dicyandiamide or primid, additives (e.g. benzoin for degassing and preventing pin holes, metallic particles, mica particles, and/or other additive chemicals commonly used in powder coatings to adjust appearance, texture and/or gloss of a powder coating), and/or an extender (i.e. fillers). See e.g. U.S. patent application publication 2010/0327479 published Dec. 30, 2010 (Ziniel et al) the contents of which are hereby incorporated by reference.

Such other functional input filaments may be combined with single-color input filaments in filament mixer 200. However, in alternative contemplated embodiments there may be multiple mixers (i.e. mixing stages) that are a part of fabricator 5 such that functional input filaments can be combined with the output extrudate mixture dispensed from a first stage filament mixer 200 in one or more subsequent functional input filament mixers. Such subsequent functional input filament mixers may have the ability to mix into the extrudate mixture prior to solidification components that are not necessarily in filament form (e.g. liquids, powders, pastes, etc. . . . ). At the end of all mixing stages the extrudate mixture would be deposited onto a extrudate receiving platform.

In a contemplated embodiment of the present invention as shown in FIG. 2 each input filament 10 is conveyed to filament mixer 200 by filament feeder 120 through a PTFE (i.e. Teflon®) filament tube 130. Use of a filament tube 130 can help prevent the input filament 10 from bending, buckling or compressing when being fed into mixer 200 and can improve performance.

Figure 4:
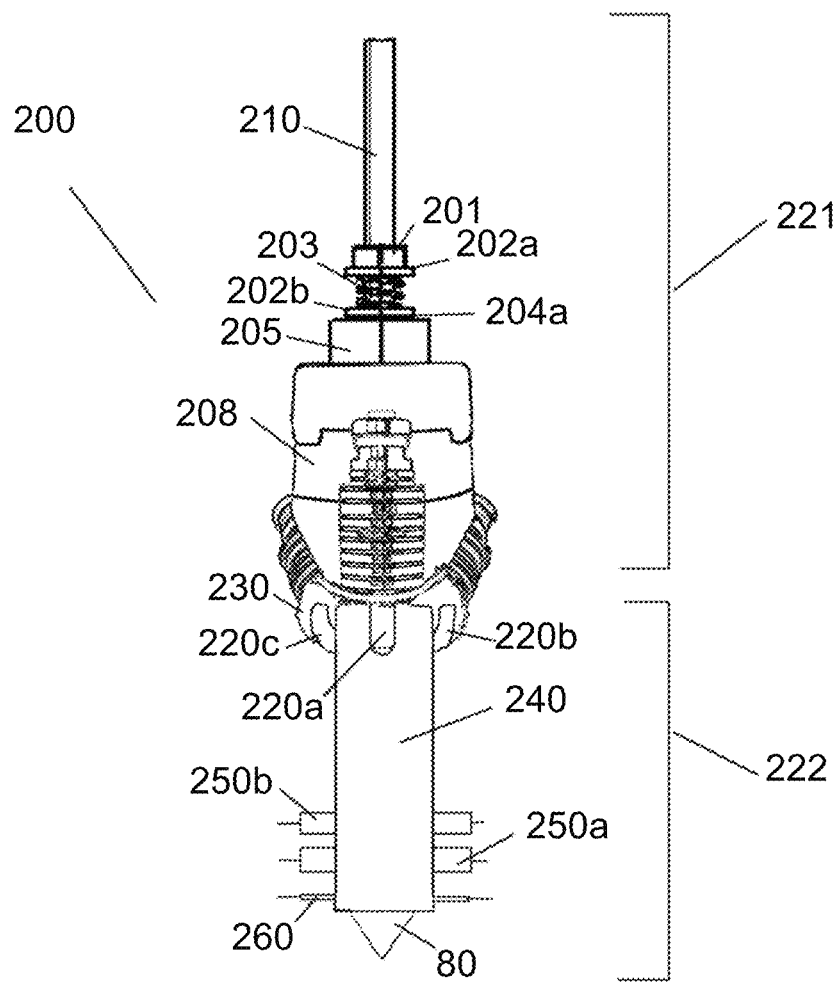
FIG. 4 is a front side view of an exemplary embodiment of a filament mixer component of the system of the present invention.

Referring to FIG. 4 in a contemplated embodiment of the fabricator 5 of the present invention filament mixer 200 has an upper portion 221 and a lower portion 222. Upper portion 221 is a "cold-end" of mixer 200 that is held at a temperature below the melting temperature of input filaments 10, preferably at or around ambient temperature.

Figure 11:
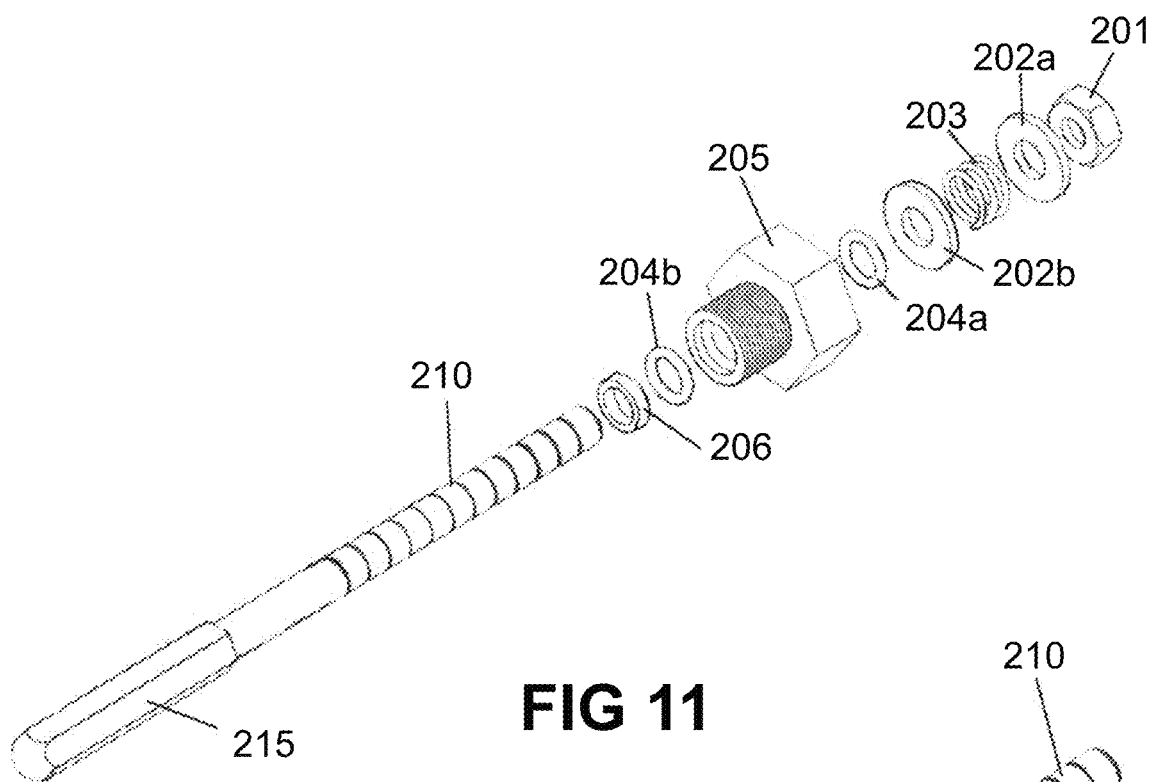
FIG. 11 is an exploded view of the parts of an exemplary embodiment of a mixing mechanism of the exemplary embodiment of the hot end of a filament mixer component as shown in FIG. 5.

Lower portion 222 is a "hot-end" of mixer 200 where mixing chamber housing 240 is heated by current flowing through heating elements 250a and 250b (e.g. heating resistors) which elevates the temperature of internal mixing chamber 82 (See e.g. FIG. 11). The temperature of mixing chamber 82 should be at or above the melting point of input filaments 10. Mixing chamber housing 240 is contemplated to be a heat conductive metallic material such as brass. The temperature of the hot-end is monitored by temperature sensor 260 which in a contemplated embodiment is a thermistor. At the bottom end of lower portion 222 is nozzle 80 which contains extrudate channel 84 through which the fluid extrudate mixture is dispensed from filament mixer 200.

FIGS. 6-12 show an exemplary embodiment of lower portion 222 and mixing mechanism 210 that could be used in a system of the present invention that utilizes three input filaments (e.g. red, green, and blue). The embodiment shown in FIGS. 6-12 is based upon the design of the MKII active mixing nozzle design set forth in *Reprap Colour Mixing Project*; James Corbett; May 1, 2012; Department of Mechanical Engineering, University of Bath; 122 pages (hereinafter the "Bath reference") the full contents of which are hereby incorporated by reference. Further reference is specifically made to the Bath reference at pages 71-88 and Appendix D-6 (pages 107-110).

Referring to FIG. 6 mixing chamber housing 240 of lower portion 222 contains inlet channels 212a, 212b, and 212c; heating element mounts 214a and 214b; and temperature sensor mount 216. Input filaments 10 from input filament inlets 220a, 220b, and 220c in upper portion 221 will pass through inlet channels 212a, 212b, and 212c into mixing chamber 82 during mixing operations. Heating elements 250a and 250b are mounted in thermal connection with mixing chamber housing 240 in heating element mounts 214a and 214b respectively. Temperature sensor 260 is mounted in thermal connection with mixing chamber housing 240 in temperature sensor mount 216.

Figure 12:
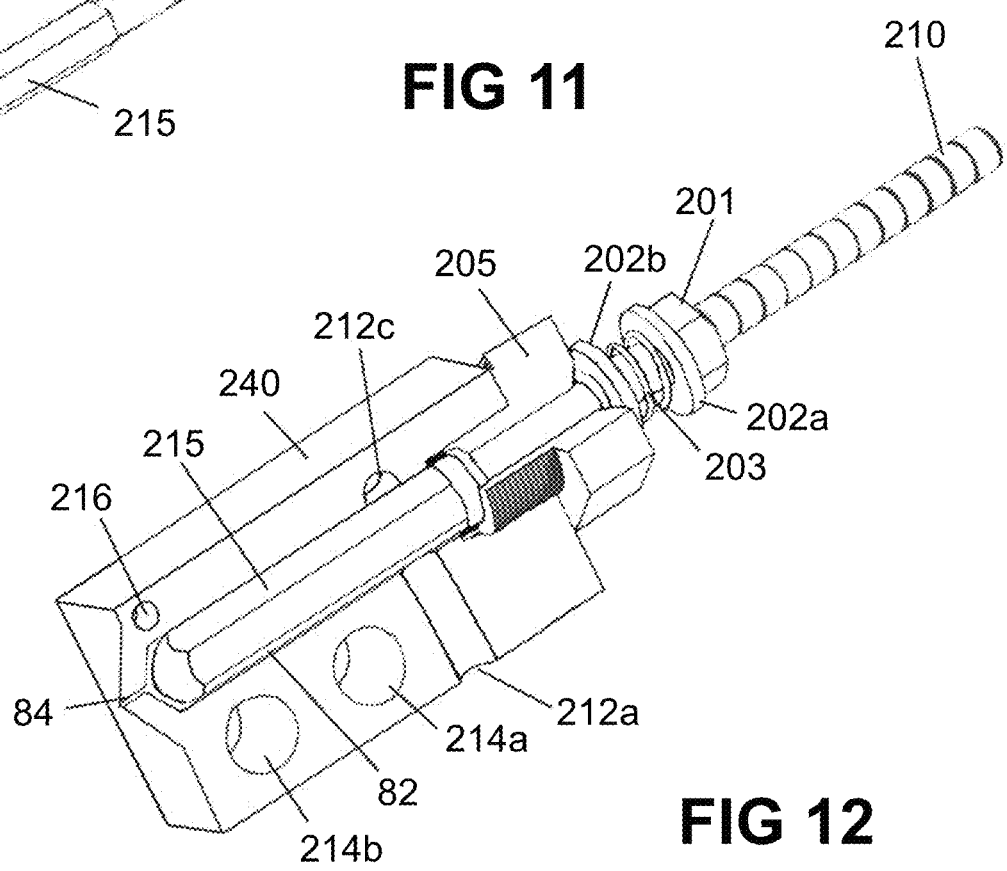
FIG. 12 is a right front side perspective view of the exemplary embodiment of the hot end of a filament mixer shown in FIG. 5 with a sectional view of the mixing chamber housing and mixing mechanism retaining bolt.

Referring to FIGS. 11 and 12 a mixing mechanism 210 is contemplated to be a shaft that is rotatably and removably attached to lower portion 221 of filament mixer 200. Mixing mechanism 210 is preferably comprised of brass and in the illustrated exemplary embodiment has a hexagonal end 215 located within and occupying substantially the entire length of mixing chamber 82. In the illustrated contemplated embodiment mixing chamber 82 should be only slightly larger in diameter than the diameter across the points of hexagonal end 215 such that hexagonal end 215 occupies substantially all the space of mixing chamber 82 (e.g. mixing chamber 82 should only be 0.3 mm larger in diameter than a hexagonal end that is 4.75 mm in diameter). At the bottom of mixing chamber 82 is extrudate channel 84. Mixing mechanism 210 is removably attached by threaded attachment to mixing mechanism retaining bolt 205 at a threaded end of mixing mechanism 210 by mixing mechanism nut 201, mixing mechanism washers 202a and 202b, mixing mechanism spring 203, mixing mechanism O-rings 204a and 204b, and brass washer 206. Mixing mechanism retaining bolt 205 is removably attached to mixing chamber housing 240 by a screw threaded friction fit.

Referring to FIG. 4, dividing upper portion 221 from lower portion 222 is thermal insulator 230 that helps prevent heat loss from lower portion 222 to upper portion 221. Thermal insulator 230 may, by way of example, be comprised of a cotton fiber fabric.

Upper portion 221 of filament mixer 200 as shown in FIGS. 2 and 4 comprises filament inlets 220a, 220b, and 220c. Referring to FIG. 2 it can be seen that the end of each filament tube 130 coming from a filament driver in filament feeder 120 is attached to each input filament inlet. Each filament inlet contains an inner passage through which an input filament 10 passes from filament tube 130 into mixing chamber 82 through inlet channels (e.g. inlet channels 212a, 212b, and 212c) in mixing chamber housing 240.

In a contemplated embodiment each input filament inlet has an exposed heat sink material (e.g. aluminum) which may be a finned form factor as shown in FIGS. 2 and 4. Upper portion 221 also comprises a mixer housing 208 which in a contemplated embodiment may also be comprised of a heat sink material.

Referring to FIG. 1 the fourth step 430 in the process of the present invention is to liquefy each input filament 10 fed into filament mixer 200. Liquefaction of an input polymer filament is accomplished by raising the temperature of mixing chamber 82 to a temperature at or above the melting point of the resin carrier of the input filament. The temperature of the mixing chamber 82 is raised and maintained by the fabricator controller 40 monitoring the temperature of the filament mixer hot-end 222 with the temperature sensor 260 and appropriately controlling the flow of electrical current through heating elements 250*a* and 250*b* to achieve the desired temperature.

As an input filament 10 enters the mixing chamber 82 through an inlet channel in mixing chamber housing 240 it will be liquefied by the heat in the mixing chamber 82. In a preferred contemplated embodiment of the present invention each input filament 10 will be fed into the mixing chamber 240 by a filament driver 300 of the filament feeder 120 through a filament tube 130 into the filament inlets at a rate appropriate to achieve the correct input filament ratio to be mixed as determined by the fabricator controller 40 based upon the input formulation data from color library database 500.

Referring to FIG. 1 the fifth step 440 in the process of the present invention is to combine the liquefied input filaments into a homogenous extrudate mixture. This combination of the liquefied input filaments is done in the mixing chamber 82 of filament mixer 200. Referring to the exemplary embodiment of FIG. 2 mixing mechanism 210 is connected to a mixer motor 110. Mixer motor 110 is controlled by fabricator controller 40 and rotates mixing mechanism 210 at a desired rotational speed and direction. In an exemplary contemplated embodiment mixer motor 110 may be a 12V DC motor with a gear ratio of 200:1 and a turning speed of approximately 80 RPM. See e.g. Bath reference at page 85. Rotation of mixing mechanism 210 by motor 110 will cause hexagonal end 215 to rotate within mixing chamber 82 producing shear forces sufficient to thoroughly mix the pigments of the liquefied input filaments that are in mixing chamber 82. The pressure of the input filaments being fed into the filament mixer 200 by the filament feeder 120 will force the liquefied filament extrudate mixture down the length of mixing chamber 82 towards nozzle 80. The shear forces generated by the rotating hexagonal end 215 will result in the liquefied input filaments being mixed together as they travel the length of the mixing chamber 82 such that by the time extrudate channel 84 is reached the pigments from the individual input filaments will be dispersed substantially uniformly throughout a homogenous extrudate mixture with the desired color.

Referring to FIGS. 1 and 2 the sixth step 450 of the process of the present invention is to dispense the extrudate mixture 70 from filament mixer 200 and solidify it. The extrudate mixture travels in liquid form from mixing chamber 82 through extrudate channel 84 under the forces generated by gravity, the rotating mixing mechanism 210, and the pressure of the input filaments 10 being fed into the filament mixer 200. The liquid extrudate mixture 70 exits extrudate channel 84 through an opening in nozzle 80 and is deposited onto an extrudate receiving platform 90 where it is solidified preferably into a substantially planar sheet.

In a contemplated embodiment extrudate 70 is solidified by cooling below the melting temperature of extrudate 70. The cooling may be done passively under ordinary ambient conditions, or may be accelerated by active cooling means such as the use of a fan forcing ambient or cooled air over the extrudate mixture on the extrudate platform 90. Extrudate platform 90 may also incorporate cooling means, such as heat sink materials or cooling coils, to accelerate extrudate 70 solidifying.

Referring to FIGS. 1 and 2 the seventh step 460 of the process of the present invention is the milling of the solidified extrudate mixture 70 into powder using extrudate mill 150. The surface of extrudate receiving platform 90 that extrudate 70 is deposited onto for solidification may be moveable (e.g. a conveyer belt) under the control of fabricator controller 40 for transporting extrudate 70 either directly into extrudate mill 150 (e.g. falls off the end of conveyer platform into extrudate mill 150) or onto/into a moveable platform or container that can be used to physically move (e.g. by hand carrying) the solidified extrudate mixture 70 to be received into extrudate mill 150. Extrudate mixture 70 travels through extrudate mill 150 to be comminuted to final powder form.

Extrudate mill 150 is contemplated to be comprised of multiple milling stages. In a contemplated embodiment extrudate mill 150 would be comprised of a first stage kibbler 151. Kibbler 151 breaks the solidified extrudate mixture 70 received from extrudate receiving platform 90 into smaller chips. Alternatively, in some embodiments this first kibbling stage may be done manually prior to processing kibbled extrudate mixture 70 through subsequent stages of extrudate mill 150. In a second grinding stage the kibbled extrudate mixture 70 is ground into a powder by grinder 152. The grinder 152 may be a pin mill such as, by way of example a Mikro® UMP Pin Mill from Hosokawa Micron Powder Systems. In a third refinement stage the ground extrudate mixture 70 is processed through a refiner 153 which is a sieving and/or air classifier mechanism that is used to de-dust and further refine the extrudate mixture 70 ground particles to an desired particle size distribution. Refiner 153 may be by way of example a Mikro® CC Air Classifier from Hosokawa Micron Powder Systems and/or a Russell Compact Sieve® vibratory sieve from Russell Finex Inc.

After the refining stage the extrudate mixture 70 exits extrudate mill 150 as the finished powder coating composition. The finished powder coating should be perceptually the same color as the color for the data representation input into the system (e.g. the color of measured sample 20). This may be confirmed by measuring the color of the end-product powder coating composition and performing a $\Delta E$ calculation with the measured color value of sample 20.

In a contemplated embodiment of the system of the present invention, prior to packaging the finished end-product powder coating composition 70, a quality control stage may be incorporated that uses a particle size analyzer 160, such as for example a Microtrac S3500 Particle Size Analyzer available from Microtrac Inc., to measure the particle size distribution of the powder coating composition. Once milled and optionally quality controlled the finished powder coating composition 70 may then be packaged (e.g. in a plastic bag preferably ≥3.0 mils thick) for transport and/or storage until ready for use.

While particular embodiments of the present invention have been shown and described, it will be obvious to those skilled in the art that based upon the teachings herein, that changes and modifications may be made without departing from this invention and its broader aspects. Therefore, the appended claims are to encompass within their scope all such changes and modifications as are within the true spirit and scope of the invention.

The invention claimed is:

1. A process for fabricating a powder coating composition from a plurality of solid input filaments comprising the steps of:

provideing a plurality of solid input filaments having distinctive characteristics to respective inlets of a mixer via respective filament drivers in accordance with an input formulation for a color of the powder coating composition;

liquefying the solid input filaments provided to the mixer;

combining the liquefied input filaments in the mixer into an extrudate mixture; and depositing the extrudate mixture from the mixer onto a platform on which the extrudate mixture is solidified and conveyed to an extrudate mill within which the solidified extrudate mixture is milled into a powder.

2. The process for fabricating a powder coating composition from a plurality of solid input filaments of claim 1 further comprising the steps of first acquiring a data representation of the color and determining from the data representation the input formulation.

3. The process for fabricating a powder coating composition from a plurality of solid input filaments of claim 2 where the step of acquiring the data representation of the color is comprised of the step of measuring the color of a sample using a color sensor.

4. The process for fabricating a powder coating composition from a plurality of solid input filaments of claim 3 where the step of determining an input formulation from the acquired data representation is further comprised of the step of selecting a best input formulation from a color library database.

5. The process for fabricating a powder coating composition from a plurality of solid input filaments of claim 4 where the best input formulation selected from the color library database is one that is associated with a color measurement in the color library database that has a $\Delta E$ value closest to zero with respect to the acquired data representation.

6. The process for fabricating a colored powder coating composition from a plurality of solid input filaments of claim 1 where the step of milling the solidified extrudate mixture into a powder comprises the steps of kibbling the solidified extrudate mixture into chips, grinding the chips into a powder, and then refining the powder.

* * * * *